US007065380B2

(12) United States Patent
Adams

(10) Patent No.: US 7,065,380 B2
(45) Date of Patent: Jun. 20, 2006

(54) SOFTWARE PARTITION OF MIDI SYNTHESIZER FOR HOST/DSP (OMAP) ARCHITECTURE

(75) Inventor: Mark L. Adams, Issaquah, WA (US)

(73) Assignee: Texas Instruments Incorporated, Dallas, TX (US)

( * ) Notice: Subject to any disclaimer, the term of this patent is extended or adjusted under 35 U.S.C. 154(b) by 634 days.

(21) Appl. No.: 09/909,010

(22) Filed: Jul. 19, 2001

(65) Prior Publication Data

US 2003/0017808 A1 Jan. 23, 2003

(51) Int. Cl.
*H04M 1/00* (2006.01)

(52) U.S. Cl. ...................... 455/550.1; 455/76; 455/563

(58) Field of Classification Search ............. 455/550.1, 455/76, 563
See application file for complete search history.

(56) References Cited

U.S. PATENT DOCUMENTS

| | | | | |
|---|---|---|---|---|
| 5,808,221 | A | 9/1998 | Ashour et al. | 84/603 |
| 5,841,054 | A | 11/1998 | Komano et al. | 84/622 |
| 5,908,997 | A | 6/1999 | Arnold et al. | 84/615 |
| 6,069,311 | A | 5/2000 | Hiramatsu | 84/659 |
| 6,549,767 | B1 * | 4/2003 | Kawashima | 455/412.2 |

* cited by examiner

*Primary Examiner*—Ahmad F. Matar
*Assistant Examiner*—Quynh H. Nguyen
(74) *Attorney, Agent, or Firm*—Wade James Brady, III; Frederick J. Telecky, Jr.

(57) ABSTRACT

A system and method implements optimal task partitioning between a general purpose processor (GPP) and a digital signal processor (DSP) to replace a fixed function ASIC solution with an OMAP software solution to implement a 3G phone that uses OMAP and requires MIDI synthesis, yielding a reduced system cost.

5 Claims, 1 Drawing Sheet

SOFTWARE PARTITION OF MIDI SYNTHESIZER FOR HOST/DSP (OMAP) ARCHITECTURE

BACKGROUND OF THE INVENTION

1. Field of the Invention

This invention relates generally to third generation (3G) wireless phones and more particularly to a technique for implementing Musical Instrument Digital Interface (MIDI) functionality without use of an Application Specific Integrated circuit (ASIC) in a handset having a multimedia processor such as Open Media Application Platform (OMAP).

2. Description of the Prior Art

Third generation (3G) wireless phones will have the processing power to run a wide variety of applications, including multimedia. MIDI sequencing and synthesis is one application required by handset manufacturers and carriers. A stand alone, fixed function ASIC that handles MIDI sequencing and synthesis is generally used as a solution. These 3G handsets may include a multimedia processor such as OMAP that defines the operations, maintenance and application protocol. The stand alone, fixed function ASICs add to the overall system cost and are also problematic since the integrated MIDI code is difficult or impossible to update dynamically.

In view of the foregoing, a need exists for a scheme to implement MIDI functionality on OMAP, eliminating the need for the ASIC.

SUMMARY OF THE INVENTION

The present invention is directed to a system and method of implementing a software solution for 3G phones that use OMAP and require MIDI synthesis. Specifically, 3G phones that use OMAP and require MIDI synthesis can replace a fixed function ASIC solution with an OMAP software solution, yielding a reduced system cost. The system and method implements optimal task partitioning between a general purpose processor (GPP) and a digital signal processor (DSP).

According to one embodiment, a MIDI synthesizer is implemented in OMAP using flash memory to allow dynamic updates of sample sets.

According to another embodiment, a MIDI synthesizer is implemented in OMAP using flash memory to allow news instruments to be added to the synthesizer.

According to yet another embodiment, a MIDI synthesizer is implemented in OMAP using flash memory to allow MIDI code to be dynamically updated from a network.

According to still another embodiment, a MIDI synthesizer is implemented in OMAP using flash memory to optimize printed circuit board (PCB) space and minimize costs associated with 3G handsets.

According to still another embodiment, a MIDI synthesizer is implemented in OMAP using flash memory to optimize use of DSP memory by only loading required sample sets from flash for any given MIDI file.

BRIEF DESCRIPTION OF THE DRAWINGS

Other aspects and features of the present invention and many of the attendant advantages of the present invention will be readily appreciated as the same become better understood by reference to the following detailed description when considered in connection with the accompanying drawings in which like reference numerals designate like parts throughout the figures thereof and wherein.

While the above-identified drawing figures set forth alternative embodiments, other embodiments of the present invention are also contemplated, as noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION OF THE PREFERRED EMBODIMENTS

Third generation (3G) wireless phones will have the processing power to run a wide variety of applications, including multimedia. MIDI sequencing and synthesis is one application that is required by handset manufacturers and carriers. A stand alone, fixed function ASIC typically handles the MIDI sequencing and synthesis. The present inventor realized handsets that include a multimedia processor such as OMAP can implement MIDI functionality on OMAP, eliminating the need for the ASIC, and achieve a significant cost reduction.

Software implementations for heterogeneous multi-processor configurations, such as OMAP, require careful design considerations to achieve optimized performance in terms of power and memory requirements. Specifically, the way software is partitioned across different processors is critical. A system and method of partitioning MIDI sequencing and synthesis software for OMAP to achieve optimal performance according to one embodiment is described herein below with reference to FIGS. 1 and 2.

Figure 1:
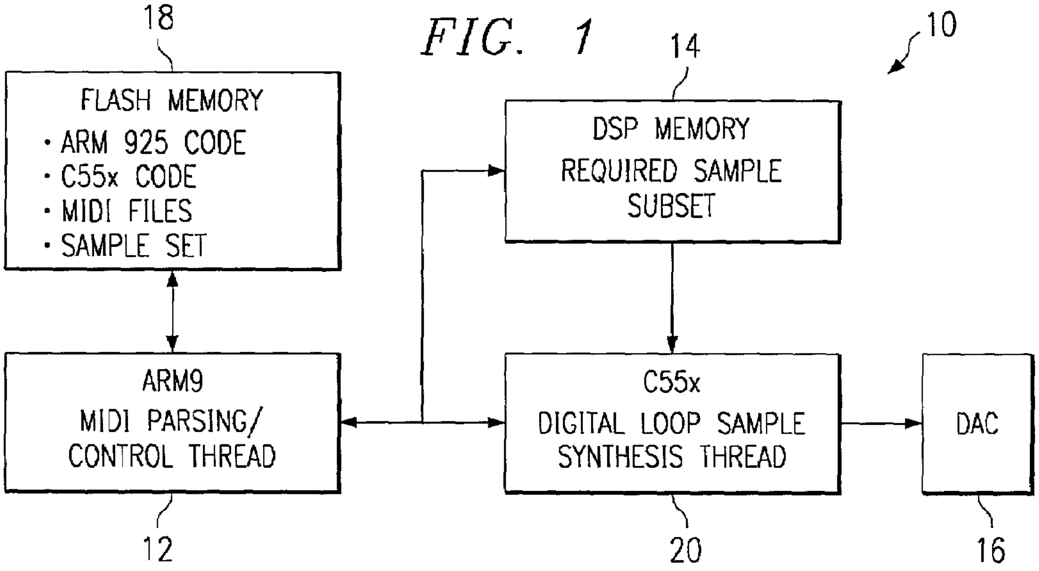
FIG. 1 is a block diagram illustrating a system and method for implementing a MIDI software partition for OMAP according to one embodiment of the present invention.

FIG. 1 is a high level block diagram illustrating a system and method 10 for implementing a MIDI software partition for OMAP according to one embodiment of the present invention. An ARM9 general purpose processor (GPP) 12 handles the task of reading and parsing MIDI files stored in a flash memory 18 and sending the appropriate synthesizer commands to the digital signal processor (DSP) 14. Since the GPP 12 is byte addressable, it is more efficient in parsing a MIDI stream of byte granularity. The DSP 14 handles the media intensive task of audio synthesis and rendering the audio to the digital-to-analog converter (DAC) 16. The flash memory 18 architecture, dual management and control (MAC) and DSP peripherals 20 for driving the DAC 16 make the DSP 14 more efficient for this task. The DSP peripherals 20 include a C55x chipset commercially available from Texas Instruments Incorporated of Dallas, Tex.

Figure 2:
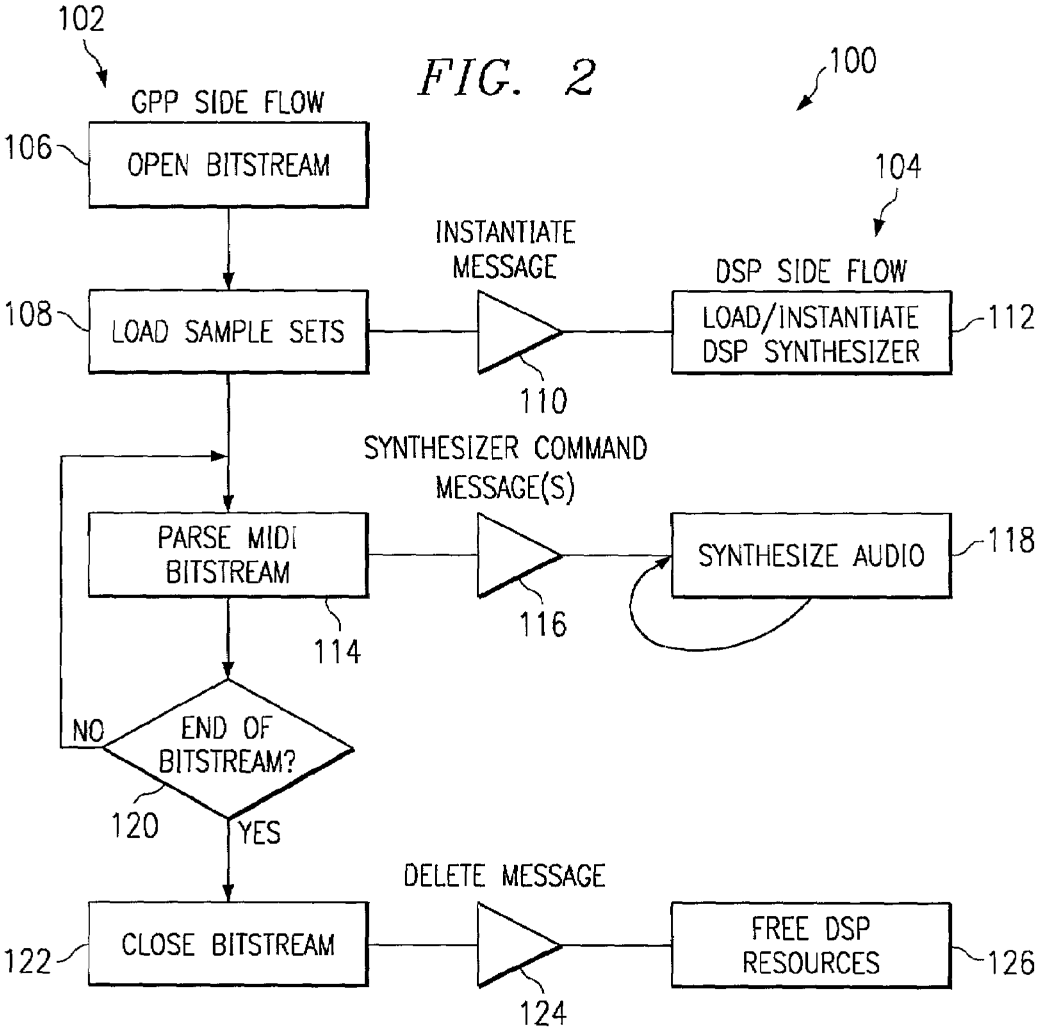
FIG. 2 is flowchart illustrating GPP and DSP threads for the system and method depicted in FIG. 1.

FIG. 2 is flowchart 100 illustrating GPP 12 and DSP 14 threads 102, 104 for the system and method 10 depicted in FIG. 1. The interaction of threads 102, 104 is initiated when the GPP 12 first opens a MIDI bit stream as shown in block 106. The GPP 12 will perform an initial examination of the MIDI bit stream to determine what sample sets must be loaded to DSP 14 memory. The GPP 12 will then load and instantiate (make an instance of code and data that can be executed) the DSP code as shown in blocks 108 and 110 respectively, initialize the sample set memory (that may reside in either shared memory, or DSP memory) and signal the DSP 14 to start running the DSP synthesizer as shown in block 112. Subsequently, the GPP 12 will parse the MIDI data into synthesis packets as shown in blocks 114 and 116, which are then transferred to the DSP 14. The DSP 14 takes the time stamped MIDI commands, synthesizes them and renders the audio to the DAC 16 as depicted in block 118. The foregoing process continues until the MIDI bit stream is completely read as shown in blocks 120 and 122, or until the user terminates the application. At that point, the GPP 12 signals the DSP 14 to stop running the synthesis thread, de-allocate memory used, and finally terminate the thread as shown in blocks 124 and 126.

In view of the above, it can be seen the present invention presents a significant advancement in the art of 3G handsets that include a multimedia processor such as OMAP to implement MIDI functionality on OMAP, eliminating the need for an ASIC to achieve a significant cost reduction. Further, this invention has been described in considerable detail in order to provide those skilled in the data communication art with the information needed to apply the novel principles and to construct and use such specialized components as are required. In view of the foregoing descriptions, it should be apparent that the present invention represents a significant departure from the prior art in construction and operation. However, while particular embodiments of the present invention have been described herein in detail, it is to be understood that various alterations, modifications and substitutions can be made therein without departing in any way from the spirit and scope of the present invention, as defined in the claims which follow.

What is claimed is:

1. A method of implementing musical instrument digital interface (MIDI) synthesis comprising the steps of:

(a) providing a wireless handset having dual processor management control associated with a general purpose processor (GPP) and a digital signal processor (DSP), a flash memory having MIDI data stored therein, a digital-to-analog converter (DAC) and digital signal processor (DSP) peripherals to drive the DAC;

(b) interrogating the flash memory via the GPP to open a MIDI bit stream and determine sample sets to be loaded into a DSP memory associated with the DSP;

(c) loading and instantiating via the GPP, a DSP code associated with the sample sets into the DSP memory;

(d) initializing a sample set memory and signaling the DSP to start running a DSP synthesizer;

(e) parsing the MIDI bit stream into synthesis packets comprising MIDI commands via the GPP;

(f) transferring the synthesis packets to the DSP via the GPP; and (g) time stamping and synthesizing the MIDI commands via the DSP to render audio signals to the DAC.

2. The method according to claim 1 further comprising the steps of:

(h) closing the MIDI bit stream when the MIDI bit stream has been exhausted;

(i) causing the DSP to stop synthesizing the MIDI commands; and (j) de-allocating the sample set memory.

3. The method according to claim 1 further comprising the step of closing the MIDI bit stream in response to a user command.

4. A method of implementing musical instrument digital interface (MIDI) synthesis comprising the steps of:

(a) providing a wireless handset having dual processor management control associated with a first data processor and a second data processor, a flash memory having MIDI data stored therein, a digital-to-analog converter (DAC) and digital signal processor (DSP) peripherals to drive the DAC;

(b) interrogating the flash memory via the first data processor to open a MIDI bit stream and determine sample sets to be loaded into a shared memory;

(c) loading and instantiating via the first data processor, a second data processor code associated with the sample sets into the shared memory;

(d) initializing a sample set associated with the shared memory and signaling the second data processor to start running a MIDI synthesizer;

(e) parsing the MIDI bit stream into synthesis packets comprising MIDI commands via the first data processor;

(f) transferring the synthesis packets to the second data processor via the first data processor; and (g) time stamping and synthesizing the MIDI commands via the second data processor to render audio signals to the DAC.

5. The method according to claim 4 further comprising the steps of:

(h) closing the MIDI bit stream when the MIDI bit stream has been completely read;

(i) causing the second data processor to stop synthesizing the MIDI commands; and (j) de-allocating the sample set memory.

* * * * *